United States Patent [19]

Yamamoto et al.

[11] Patent Number: 4,799,761
[45] Date of Patent: Jan. 24, 1989

[54] PLASTIC OPTICAL TRANSMISSION MEDIUM, PROCESS FOR PRODUCING THE SAME AND ARRAY OF LENSES USING THE SAME

[75] Inventors: Takashi Yamamoto; Yoshihiko Mishina; Masaaki Oda, all of Hiroshima, Japan

[73] Assignee: Mitsubishi Rayon Co., Ltd., Tokyo, Japan

[21] Appl. No.: 31,508

[22] Filed: Mar. 27, 1987

[30] Foreign Application Priority Data

Mar. 27, 1986 [JP] Japan .................................. 61-67183
May 12, 1986 [JP] Japan ................................ 61-106751
May 15, 1986 [JP] Japan ................................ 61-111089

[51] Int. Cl.$^4$ .............................................. G02B 6/18
[52] U.S. Cl. ................................ 350/96.31; 264/1.1; 350/96.18; 350/96.34; 350/413
[58] Field of Search .................. 350/413, 96.10, 96.18, 350/96.24, 96.25, 96.27, 96.29, 96.30, 96.31, 96.34, 320; 264/1.5, 1.1

[56] References Cited

U.S. PATENT DOCUMENTS

| | | | |
|---|---|---|---|
| 3,658,407 | 4/1972 | Kitano et al. | 350/96.25 |
| 4,167,305 | 9/1979 | Ichiba et al. | 350/96.34 |
| 4,327,965 | 5/1982 | Black | 350/96.34 X |
| 4,482,204 | 11/1984 | Blyler, Jr. et al. | 350/96.34 |
| 4,593,973 | 6/1986 | Yoshida et al. | 350/96.29 |
| 4,615,583 | 10/1986 | Tsuno et al. | 350/96.25 X |
| 4,647,153 | 3/1987 | Utsumi et al. | 350/96.25 |

OTHER PUBLICATIONS

Appel, "Method of Assembling A Gradient Index Lens Array", *Xerox Disclosure Journal*, vol. 6, No. 2, Mar.-/Apr. 1981, p. 69.

*Primary Examiner*—John D. Lee
*Attorney, Agent, or Firm*—Brumbaugh, Graves, Donohue & Raymond

[57] ABSTRACT

A plastic optical transmission element having a body in which the refractive index varies continuously in a radial direction from the interior toward the surface of the body, may be free from the troubles derived from irregularity of the index distribution and flare by having a layer containing a light-absorbing substance under the surface thereof. Such a layer may be formed by contacting an untreated element with a solvent containing the light absorbing substance, when the solvent is selected so as to be capable of at least partially dissolving the plastic of the element.

24 Claims, 8 Drawing Sheets

PLASTIC OPTICAL TRANSMISSION MEDIUM, PROCESS FOR PRODUCING THE SAME AND ARRAY OF LENSES USING THE SAME

FIELD OF THE INVENTION

The present invention relates to a plastic optical transmission medium usable as various wave guides such as light-converging lenses and light-converging optical fibers. It also relates to a process for producing said plastic optical transmission medium. It further relates to an array of lenses in which lenses formed from said plastic optical transmission medium are set in array.

BACKGROUND OF THE INVENTION

It is known to use, lenses or optical fibers formed from a transparent cylindrical body or fiber in which the index of refraction varies continuously in proportion to a quadratic of the distance in a radial direction from the interior toward the surface thereof. For example, an index-distributed (graded-index) lens comprising a transparent substance shaped into a cylindrical body may be used for image transmission etc. Rays of light incident upon one end face of the body progress through the body and exit from another end face and form an image. An array of lenses for use in, for example, photocopiers must have high resolving power and be good in optical properties.

Index-distributed lenses are capable of forming an undistorted image only when it has the ideal index distribution expressed by the equation: $N(r) = N_0 (1 - Ar^2)$ in which $N(r)$ is the refractive index at a point which is a distance r from the central axis in a radial direction, $N_0$ is the refractive index on the central axis, and A is a positive constant.

Heretofore, there have been reported various methods for achieving adequate index distributions. However, it has been difficult to fulfill the ideal equation over the entire radial thickness, i.e. from the central axis through the periphery of the lens body, and only a complicated process has enabled adequate distributions. When the index distribution as reflected by the positive constant A near the central axis is different from that near the periphery, the lens becomes inferior in the resolving power and cannot be used for photocopiers and the like.

Further, even when the index distribution near the periphery deviates only slightly from an ideal distribution, a flare can be formed as a result of this irregularity of the index distribution and outer rays incident upon the periphery of the lens.

The flare is a faded light harmful for the image formation and causes deterioration of the resolving power of a lens and the contrast of an image.

Japanese Patent Laid-Open Application No. 58-38901/1983 teaches a method for preventing the occurrence of flare, which method comprises subjecting the surrounding face of the index-distributed lens to a chemical etching and changing said face into a coarse face having fine convex or concave surface structures. This coarse face may radiate needless rays progressing toward the outer layer of the lens therefrom by the scattering thereof, thus preventing transmission of the outer rays in the lens by the diffused reflection thereof. The coarse surrounding face of the lens leads to stress concentration due to the sharp concave and convex contours, however and has weak mechanical strength due to the presence of relatively deep cracks. It, therefore, is apt to cause break down of the lens at the assembling thereof.

U.S. Pat. No. 3,658,407 discloses a black resin to be used as an adhesive for combining lenses into lens arrays. Such arrays may exhibit leakage of light and deterioration of optical properties by virtue of the occurrence of transparent parts among adjacent lenses. These transparent portions are caused by the separation of black pigment of the adhesive between lenses as well as by the high viscosity of the adhesive which causes uneven permeation thereof into the coarse surrounding face.

Further, optical transmission media are required, to transmit reduced quantities of light to be suitable as lenses for use with light receptor devices such as CCD image sensors used in an electronic blackboard.

There are several methods for reducing the quantity of light to be transmitted, such as reducing the diameter of the lens, forming a light-reducing mask on the end faces of the lens and the like. When the diameter of lens is reduced, the mechanical strength of lens weakens and risks attendant upon handling of lens to be set into arrays or processability of assembling an array become worse. When the light-reducing mask is used, the manufacturing cost of lenses become expensive.

SUMMARY OF THE INVENTION

It is one object of the present invention to provide a plastic optical transmission medium free from troubles derived from irregularity of the index distribution, as well as a process for producing said medium.

It is another object of the present invention to provide a plastic optical transmission medium capable of preventing flare more perfectly than the conventional mediums, as well as a process for producing said medium.

It is still another object of the present invention to provide a plastic optical transmission medium capable of controlling the quantity of light to be transmitted therethrough, as well as a process for producing said medium.

It is still another object of the present invention to provide an array of lenses using the plastic optical transmission medium which have improved effectiveness in light transmission.

The present invention, in a first aspect, resides in a plastic optical transmission medium having a body in which the refractive index varies continuously in a radial direction from the interior toward the surface of the body, said body having a layer formed under the surface thereof and containing a light-absorbing substance.

The present invention, in a second aspect, resides in a process for producing a plastic optical transmission medium comprising forming a shaped plastic optical transmission element in which the refractive index varies continuously in a radial direction from the interior toward the surface of the body, bringing the thus shaped element into contact with a liquid comprising a mixture of a solvent and a light-absorbing substance, and drying to thereby form a layer containing the light-absorbing substance under the surface of the shaped substance.

The present invention, in a third aspect, resides in an array of lenses comprising a number of plastic optical transmission mediums which have a body in which the refractive index varies continuously in a radial direction from the interior toward the surface of the body, said body having a layer formed under the surface thereof and containing a light-absorbing substance.

DETAILED DESCRIPTION OF THE INVENTION

The plastic optical transmission medium of the present invention may be shaped into various shaped optical elements in accordance with its various uses. For example, the medium may be used as a single lens in the shape of a cylinder. Such a single lens may be used as a connector of optical fibers, as a beam splitting lens for an optical fiber, as a pickup lens and the like. In this case, the image to be formed may be inverted. The lens is, in general, used in rather short length and will usually have a length of 1 to 10 mm and a diameter of 1 to 5 mm.

Another important use of the medium is in an array of lenses in which many cylindrical lenses are arranged in parallel for forming an uninverted image having the same magnification as the source. The array of lenses may be used for a photocopier, a facsimile, an electronic blackboard, a liquid crystal printer, a laser printer, etc. The size of the lenses is determined in consideration of the application of the array. In general, those having a diameter of 0.1 to 3 mm and a length of 5 to 30 mm are used.

Figure 1A:
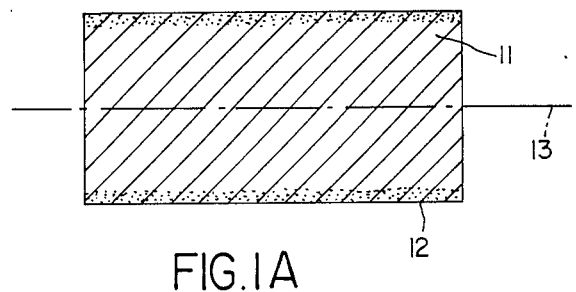
FIG. 1(A) shows a longitudinal cross section of an example of a plastic optical transmission medium according to the present invention.

FIGS. 1(A) and (B) respectively showed longitudinal and lateral cross sections of one example of a plastic optical transmission medium of the present invention.

The optical transmission medium has a transparent cylindrical body 11 and has an index distribution such that the refractive $N(r)$ at a distance r from the central axis 13 in the radial direction is expressed by the equation $N(r) = N_0 (1 - Ar^2)$ in which $N_0$ is the refractive index at the central axis 13 and A is a positive constant. A layer containing a light-absorbing substance 12 is formed under the surface of the cylindrical body 11.

Figure 1B:
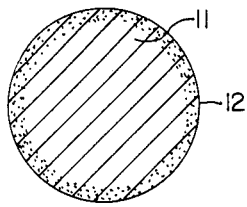
FIG. 1(B) shows its lateral cross section.

The medium making up the cylindrical body 11 as shown in FIG. 1 has an ideal index distribution. However, the plastic optical transmission medium of the present invention may have various distributions which depart from an ideal form as shown in FIGS. 7(A) through (D).

Figure 7D:
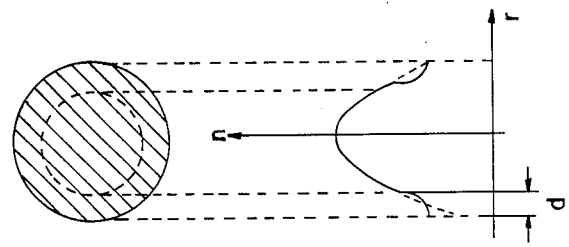
FIGS. 7(A) through (D) shows the index distribution within several examples of the plastic optical transmission medium of the present invention.
Figure 7C:
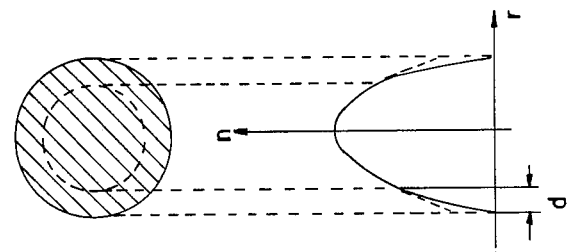
Figure 7B:
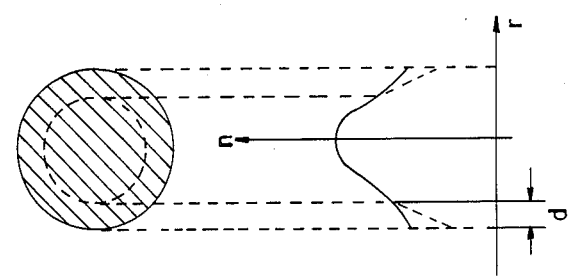
Figure 7A:
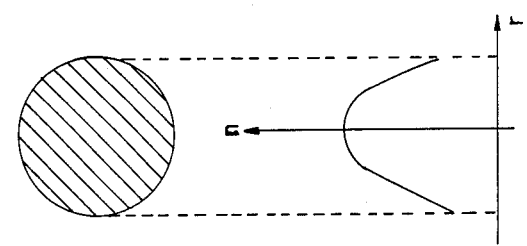

FIG. 7(A) shows a lens having said ideal index distribution. The lens, however, causes the flare and has low resolving power if it has no layer containing a light-absorbing substance.

FIGS. 7(B), (C) and (D) show lenses that include a peripheral region of the thickness of d having an index distribution different from that of the central portion of the lens.

The lens shown in FIG. 7(B) includes a peripheral region having a larger index than the ideal index of refraction. As a result, a square lattice image transmitted by the lens has a peripheral portion in which the square lattice is smaller than the central portion of the image.

The lens shown in FIG. 7(C) includes a peripheral region having a smaller index than the ideal index of refraction. As a result, a square lattice image transmitted by the lens has a peripheral portion in which the square lattice is larger than the central portion of the image.

The lens shown in FIG. 7(D) has a complex form of the index distributions as shown in FIGS. 7(B) and (C). The image formed has more complex distortions at the periphery thereof.

Since the lenses as shown in FIGS. 7(B), (C) and (D) have small resolving power and cause significant distortion of the transmitted image they have little practical utility in, for example, photocopiers where it is necessary to have high resolving power. When formed in accordance with the present invention, however, lenses having index distributions such as shown in FIGS. 7(B), (C) and (D) can have enhanced utility. The plastic optical transmission medium of the present invention may prevent such distortion of an image by means of a layer of light-absorbing substance incorporated under the surface of the lens which is capable of absorbing rays causing an image distortion. Further, even in the case of the index distribution as shown in FIG. 7(A), the formation of a layer of light-absorbing substance in accordance with the present invention can prevent flare very easily without requiring mechanical damage of the lens.

As mentioned above, the light-absorbing substance used in the present invention has synergy in concealing irregularities of the index distribution and absorbing flare in the periphery of the medium.

The thickness of the layer containing a light-absorbing substance preferably is equal to or near that of the peripheral portion in which irregularity of the index distribution exists.

In general, irregularities of the index distribution are liable to occur in the periphery of the lens or fiber, in particular in the outermost 200 μm or less, because the peripheral portion must have a large index gradient, in other words, it must have the greatest change in the composition of the forming material.

When the radius of a shaped optical transmission element is represented by r, and the thickness of the peripheral light absorbing region is represented by d, the cross sectional area of the portion in which rays of light are transmitted may be expressed by $\pi (r-d)^2$. When the value of $$\frac{\pi(r-d)^2}{\pi r^2} = \frac{r-d^2}{r}$$

is too small, that is 0.4 or less, irregularity of the quantity of light becomes too large, so that an array of lenses loses practical value. Thus, the preferred upper limit for d in the present invention may be expressed by the following in quality: $d \leq 0.39$ r. The preferable lower limit of d may be determined by the action force of the light-absorbing substance to be used. The d value is preferably 1 μm or more, more preferably 5 μm or more, most preferably 8 μm or more.

Preferred examples of materials for forming a plastic optical transmission medium are described in the Japanese Patent Applications Nos. 60-127553 and 60-130837.

Such preferable examples are represented by a plastic optical transmission medium having a continuous refractive index distribution, characterized by being composed of at least one of a thermoplastic polymer (A) and a polymer derived from a monomer (B) or a mixture of two or more monomers including said monomer (B) and having a refractive index different from that of said thermoplastic polymer (A), the latter polymer having a continuous concentration distribution from the center of said optical transmission medium as molded product toward the surface thereof. In particular, a preferred optical transmission medium comprises a mixture of component (A) consisting of polyvinylidene fluoride or a copolymer containing as a chief monomeric unit vinylidene fluoride and a component (B) consisting of polymethyl methacrylate or a copolymer containing as a chief monomeric unit methyl methacrylate, the ratio of the amounts of the components (A) and (B) varying from the interior toward the surface of the optical transmission medium so as to form the distribution of the refractive index therein.

The optical transmission medium of the present invention may also contain as a major constituent a mixture of one or more polymers selected from said (A) components and one or more polymers selected from said (B) components. As the (A) components, polyvinylidene fluoride or copolymers containing as a chief monomeric unit vinylidene fluoride may be used. Illustrative examples of such copolymers include copolymers of vinylidene fluoride with fluorine containing vinyl compounds such as tetrafluoroethylene, trifluoroethylene, hexafluoropropylene, vinyl fluoride, chlorotrifluoroethylene, perfluoroalkyl vinyl ether, hexafluoroacetone and the like, and esters of methacrylic acid such as methyl methacrylate, butyl methacrylate, vinyl acetate.

Among these copolymers, a copolymer of vinylidene fluoride with tetrafluoroethylene or trifluoroethylene is preferable in view of heat resistance, mechanical properties, processability, balance of refractive index and other practical properties. The content of vinylidene fluoride in the copolymer thereof with tetrafluoroethylene is preferably at least 60% by mol. In the case of the copolymer with trifluoroethylene, the content of vinylidene fluoride is preferably at least 20% by mol.

As the (B) component, polymethyl methacrylate or a copolymer containing as a chief monomeric unit methyl methacrylate is used. The comonomer may be a methacrylate such as ethyl methacrylate, propyl methacrylate, n-butyl methacrylate, t-butyl methacrylate, cyclohexyl methacrylate, phenyl methacrylate, benzyl methacrylate, 2,2,2,-trifluoroethyl methacrylate, β-hydroxyethyl methacrylate, glycidyl methacrylate, β-methylglycidyl methacrylate; an acrylate such as methyl acrylate, ethyl acrylate, propyl acrylate, butyl acrylate; methacrylic acid; acrylic acid; styrene; α-methylstyrene and the like. However, the comonomer need not be limited to these monomers. The copolymer may contain a small amount of acrylonitrile, maleic anhydride and various other comonomers.

The content of the comonomers other than methyl methacrylate is 50% by weight or less, preferably 30% by weight or less, more preferably 15% by weight or less.

If desired, more than two types of polymers may be used as the (A) or (B) component.

The mixture of said (A) and (B) components used in accordance with the present invention should have good mutual solubility and may mostly obtain dispersion in the level of molecules. Although polymers having substantially different refractive indices from each other are to be mixed, transparency may be achieved in a wide range of proportions of the mixed polymers. Transparency may be attained in such a range that the content of the (A) component is 0-80% by weight, preferably 0-70% by weight. When the content of the (A) component surpasses 80% by weight, the vinylidene fluoride polymer tends to crystallize, so that the transmission medium become lactescent and opaque. That is to say, the optical transmission medium in accordance with the present invention may have distribution of the concentration of the (A) component in the numerical range of 0-80% by weight, preferably 0-70% by weight and in the spatial range of from the interior toward the surface thereof in at least the part thereof. The refractive index may vary in accordance with the distribution of the concentration of the (A) component.

Figure 2:
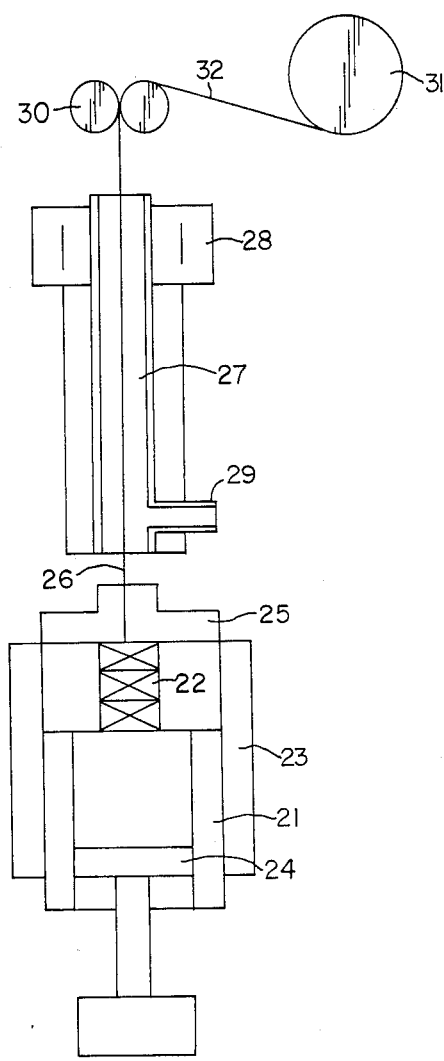
FIGS. 2 through 4 show apparatus used for producing the plastic optical transmission medium of the present invention.

A preferred example of a process for producing the optical transmission medium of the present invention will be described in more detail referring to an example wherein vinylidene fluoride-tetrafluoroethylene copolymer and polymethyl methacrylate are used. Further, an apparatus for producing the optical transmission medium of the present invention will be illustrated in FIG. 2 as an outline.

A mixture of vinylidene fluoride-tetrafluoroethylene copolymer, polymethyl methacrylate and methyl methacrylate monomer is fed into a cylinder 21, followed by pushing it out quantitatively by means of a piston 24 while heating it by means of a heater 23, blending the mixture homogenously at a kneading part 22, and extruding the mixture from a nozzle 25 to obtain a fiber strand 26, leading this fiber strand 26 to a volatilization part 27 where methyl methacrylate monomer is volatilized from the surface of the fiber by means of an inert gas such as air, $N_2$, Ar, etc. introduced through a gas-introducing port 29, to yield a concentration distribution of methyl methacrylate inside the fiber. This concentration distribution is controlled by the thickness of the fiber strand, extruded quantity, take-up rate of the fiber, residence time in the volatilization part, temperature of the volatilization part, flow quantity of gases, etc. in accordance with the object. The resulting fiber is then fed to an active light-irradiating part 28 to polymerize the remaining monomer. The solidified strand is taken up on a take-up drum 39 via nip rolls 30 to continuously obtain the objective optical transmission medium 40. The light irradiation in the present invention may be after the volatilization step, but if the condition establishment is possible, volatilization and light-irradiation may be carried out at the same time. Further, the volatilization may be carried out in a flow of an inert gas such as air, $N_2$, Ar etc., and may also be carried out under reduced pressure. Moreover, in order to further reduce the quantity of the remaining monomer in the optical transmission medium 32, a heat polymerization part may be provided after the light-irradiating part, or a process of further carrying out the light irradiation under heating to the glass transition point (Tg) of the polymer or higher is also preferred.

Particularly a process of carrying out spinning upwards and pulling up the fiber vertically is preferred in that strand unevenness of the fiber is reduced and the controlling width of the volatilization conditions is broadened.

Further it is an effective means to add a known photo-initiator, promoter or sensitizer for promoting photopolymerization of the above mixture as the raw material and simultaneously use these.

The above mixture becomes translucent or milkwhite at low temperatures since vinylidene fluoride/tetrafluoroethylene copolymer crystallizes; hence the storage temperature of the mixture is preferably 30° C. or higher, more preferably 60° C. or higher.

Similarly, the temperature at the volatilizing part is also preferred to be high, that is, preferred to be in the range of 40° to 110° C. At temperatures lower than 40° C., vinylidene fluoride copolymers sometimes crystallize during the volatilization and the attenuation increases. At temperatures exceeding 110° C., methyl methacrylate bubbles; hence such high temperatures are also undesirable.

At that time, in order to enhance the storage stability of the above mixture and also in order to prevent the viscosity change i.e. the thermal polymerization at the time of molding the mixture into the form of a fiber or the like, it is preferred to use a known polymerization inhibitor.

The thus prepared mixture does not thermally polymerize at temperatures of about 100° C., but in order to obtain a homogeneous optical transmission medium, it is necessary to knead the mixture to sufficient homogeneity. In the kneading operation, it is possible to employ a known kneading apparatus.

Further, in order to obtain an optical transmission medium having a diameter of about 0.1 to 5 mm, the viscosity of the mixture at its extrusion temperature is particularly important, and is preferred to be in the viscosity range of 1,000 to 100,000 poises, preferably 5,000 to 50,000 poises. The viscosity adjustment may be carried out by adjusting the molecular weight of polymethyl methacrylate, or by adjusting the concentration. Particularly mixtures having an intrinsic viscosity $\eta$ of 0.5 to 3.0 g/dl (as measured in methylethyl ketone at 25° C.) are preferred in that the viscosity adjustment is not only easily carried out, but also the storage stability and stringiness of the mixture are superior.

As the active light source capable of being used in the present process, carbon-arc lamp, ultra-high pressure mercury lamp, high pressure mercury arc lamp, low pressure mercury arc lamp, chemical lamp, xenon lamp, laser rays, etc. emitting a light having a wavelength of 150 to 600 nm may be employed. Further, in some cases, polymerization may be carried out by irradiation with electron rays. Further, in order to complete the polymerization, or in order to make the quantity of the remaining monomer as small as possible, it is effective to carry out the photo-irradiation at two stages or to perform the irradiation together with thermal polymerization. Following the polymerization, the remaining monomer may be removed by drying with hot air, etc.

The quantity of the remaining monomer in the optical transmission medium of the present invention is preferred to be as small as possible, and 5% by weight or less, preferably 3% by weight or less, more preferably 1.5% by weight or less. This can be achieved according to the above processes.

Once the light transmissive body with an appropriate index gradient is formed, the light-absorbing material is added. In the present invention, various types of dyes, dyestuffs and pigments may be used as the light-absorbing substance. For the purpose of absorbing any rays in the visible region, a black-colored mixture of many dyes, dye-stuffs or pigments may preferably be used. Further, carbon black, graphite carbon, carbonized organic substance and other substances capable of absorbing light may be used as a light-absorbing substance. It is, however, industrially preferred to use oil-soluble dyes because of the rapidity with which a layer containing a light-absorbing substance can be formed.

In the present invention, the light-absorbing substance should be adequately contained in the plastic optical transmission medium. The substance should preferably be dispersed in the layer containing it. In this case, the layer may be formed by dispersing or combining dye molecules or pigment particles in the field of physical or chemical affinity, or by containing carbon black in the state of single dispersion or coagulation. Accordingly, a light-absorbing substance to be used may have a size in the range of from some tens of angstroms to some tens of microns. The size may be determined in accordance with the substance constituting the optical transmission medium. The light-absorbing substance need not have a form of a particle and may take the form of a carbonized and metamorphosed substance constituting the optical transmission medium.

The concentration of a light-absorbing substance in the layer containing it is in the range of 0.01% to 20% by volume.

In addition, the size and concentration of the light-absorbing substance contained are not necessarily uniform when observed in the direction of the thickness of the layer containing it. It is, rather, advantageous that some gradient of concentration of light-absorbing substance exists in the direction of from the interior toward the surface of the medium.

The thickness of the layer containing a light-absorbing substance may be controlled by selecting solvent to be used, the type of a light-absorbing substance to be used, the mixing ratio thereof, the temperature of a mixture liquid, or the dipping time of the shaped substance.

The solvent to be used in the present invention may be any type of the solvent which is capable of dissolving one or more constituting substances of the shaped element. When the medium is constituted by a mixture of two or more components, the solvent may be capable of dissolving every component or capable of dissolving one or a few components.

Illustrative examples of the solvent to be used in the present invention are as follows. When an optical transmission medium is constituted by a copolymer of vinylidene fluoride and tetrafluoroethylene, and polymethyl methacrylate, halogen-containing solvents such as methylene chloride and tetrafluoroethylene may be used to dissolve only polymethyl methacrylate. Ketones such as acetone and methylethyl ketone or esters such as ethyl acetate may be used to dissolve both the copolymer of vinylidene fluoride and tetrafluoroethylene and polymethyl methacrylate. Such solvents may be used in the same manner as above when the optical transmission medium is formed from a copolymer of vinylidene fluoride and hexafluoropropylene or from a copolymer of vinylidene fluoride and hexafluoroacetone and polymethyl methacrylate.

The layer containing the light-absorbing substance may be formed by, for example, dipping the shaped substance in a liquid containing a solvent and a light-absorbing substance and drying the thus dipped substance.

The array of lenses of the present invention may be formed by setting the individual shaped optical transmission elements in array using an adequate adhesive. The adhesive is preferably a type that does not transmit light. The adhesive may be used to adhere a part of the individual elements together at a few or several points of contact.

Figure 3:
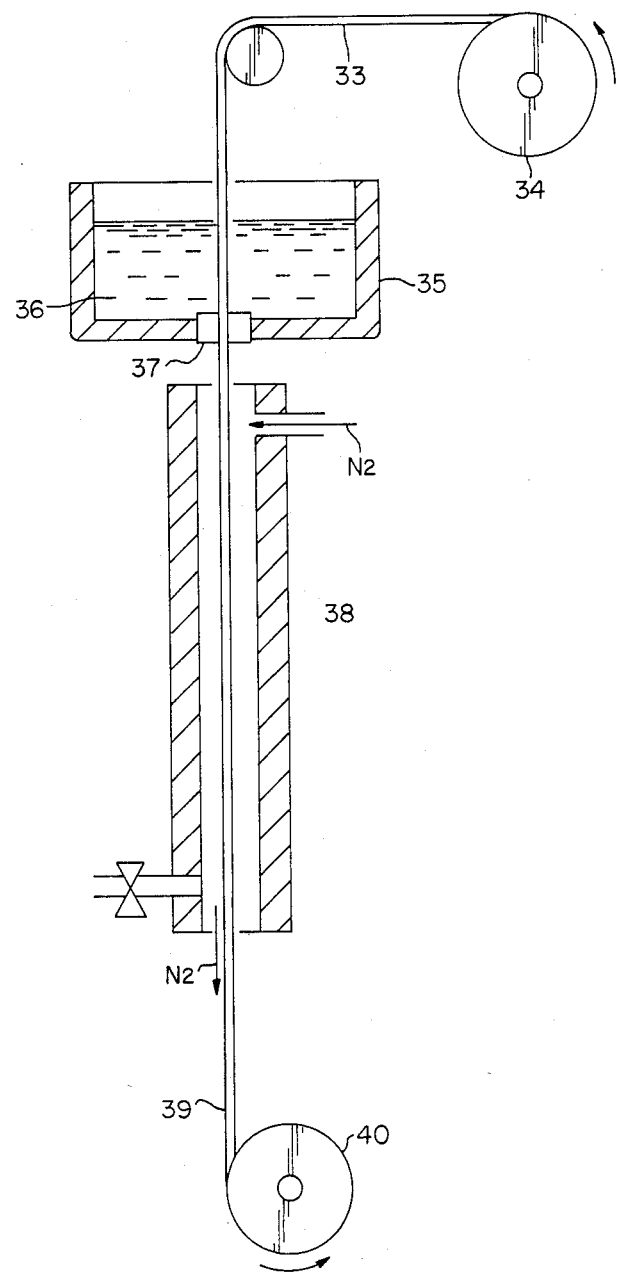

FIG. 3 shows an outline of an apparatus used for producing a plastic optical transmission medium of the present invention. In this figure, 31 is a shaped optical transmission element for forming a plastic optical transmission medium according to the invention. 34 is a bobbin for winding the shaped substance. 35 is a tank and 36 is a liquid mixture of light-absorbing substance and solvent reserved in the tank 35. 37 is a nozzle. 38 is a dryer tower. 39 is a plastic optical transmission medium of the present invention. 40 is a bobbin for winding the medium 39.

The shaped element 33 wound on the bobbin 34 is dipped in a liquid mixture 36 so as to form a layer containing a light-absorbing substance under the surface of the element 33. Then the element 33 is fed into a dryer tower 38, and subjected to solvent removal in a gas flow of nitrogen, air, etc.

The depth of the permeation of solvent depends on the temperature of the liquid mixture 36. The liquid 36 must be controlled in temperature as well as in composition which should be adjusted to that of the first stage.

FIG. 3 illustrates a process in which a shaped element is used after the shaping step is completed. The medium of the present invention may be produced in a series of the shaping step and the dipping step. In this case, the shaped element 33 is not wound on the bobbin 34, but supplied directly to the tank 35.

Figure 4:
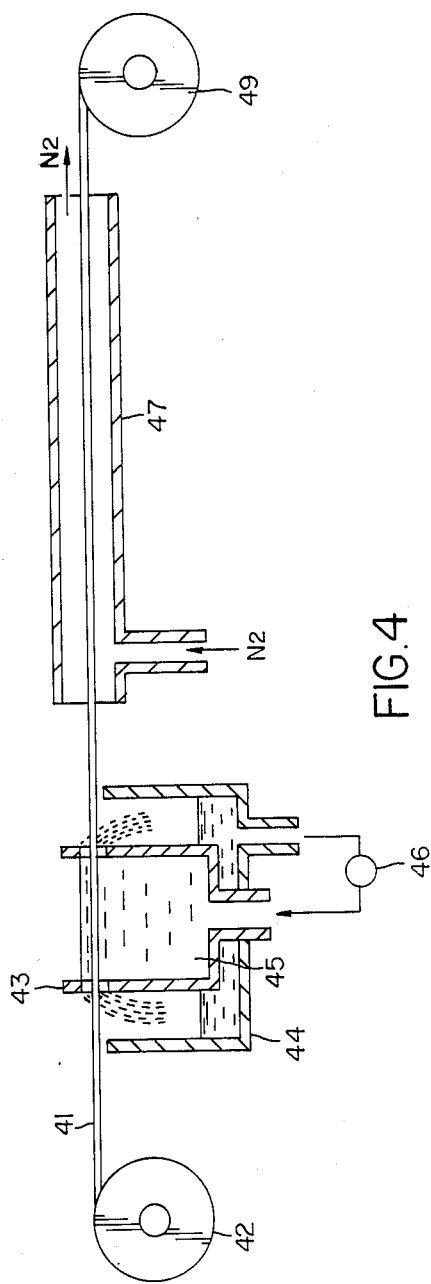

FIG. 4 also shows an outline of an apparatus used for producing a plastic optical transmission medium of the present invention. The apparatus does not have a nozzle 37 as shown in FIG. 3. Such elimination of a nozzle enables treatment of many mediums.

In FIG. 4, a liquid mixture of a light-absorbing substance and a solvent 45 is circulated between tanks 43 and 44 by means of a pump 46. The liquid 45 overflows from the tank 43 and comes into contact with a shaped substance 41. The thus dipped substance is then carried to a dryer blower 47 to eliminate a solvent.

Figure 5:
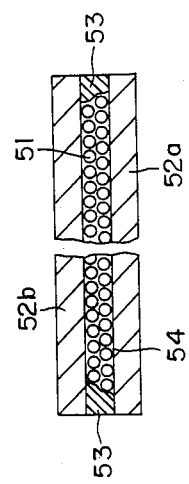
FIGS. 5 and 6 show lateral cross sections of an array of lenses according to the present invention.

FIG. 5 shows an example of an array of lenses according to the present invention. The array as shown in FIG. 5 comprises upper and lower substrates 52a, 52b and spacers 53. Many lens bodies 51, containing a light-absorbing substance are subjected to closed-packing and arranged like bricks within the array. The substrates 52a, 52b are adhered to spacers 53. An adhesive 54 fills in the spaces between the lens bodies 51, and the substrates 52a, 52b as well as between the lens bodies 51, and the spacers 53 so as to unite all parts in a single body. The end faces of the array are ground so as to form parallel planes perpendicular to the light transmission axis of the lenses and to obtain an adequate lens length for forming an uninverted image having the same magnification.

Figure 6:
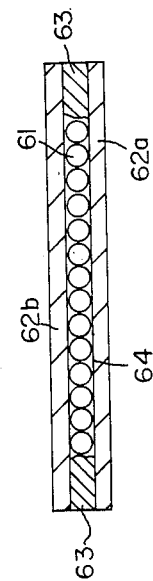

FIG. 6 also shows an example of an array of lenses of the present invention, in which lens bodies 61, are arranged in a row. 62a and 62b are substrates, 63 are spacers, and 64 is an adhesive. There are no restrictions on the number of lenses to be arranged or the form of the arrangement. Since the surrounding faces of the lenses do not have weakened mechanical strength due to poor surface conditions, the number of lenses to be arranged may easily be increased. Further, the substrates do not necessitate high mechanical strength and may be any type of the material which is capable of conserving the shape of an array. This is to say, rather light and cheap resin boards may advantageously be used rather than the conventional fiber-reinforced resin boards. In particular, polymethyl methacrylate resin board is preferred in view of its good weatherability.

The adhesive to be used may be chosen from those capable of preventing light transmission, such as epoxy type adhesives, silicone type adhesives and the like. The curing type thereof is not limited and may be heat curing type, two liquids-mixing type and the like.

The permeation mechanism of a light-absorbing substance in accordance with the present invention varies depending on the selected combination of materials for forming a shaped substance and of a light-absorbing substance.

In the case of using a mixture of a copolymer of vinylidene fluoride and tetrafluoroethylene and polymethyl methacrylate, chloroform and a dye soluble in chloroform, chloroform dissolves polymethyl methacrylate and, at the same time, swells said copolymer. Thus, chloroform takes the role of a carrier for the permeation of dyes. Since chloroform dissolves and extracts only polymethyl methacrylate, voids occur at the position of PMMA thus dissolved. Therefore, the process of the present invention attains uneven face inside the medium and the permeation of a light-absorbing substance.

The present invention will be explained in more detail with reference to the follow Examples.

EXAMPLE 1

The mixture of 33 parts by weight of the copolymer comprising 60% by mole of vinylidene fluoride and 20% by mole of tetrafluoroethylene (refractive index $\eta_D = 1.400$), 33 parts by weight of polymethyl methacrylate prepared by continuous bulk polymerization (refractive index $\eta_D = 1.492$), 33 parts by weight of methyl methacrylate, 0.1 part by weight of benzylmethyl ketal and 0.1 part by weight of hydroquinone was heated at 80° C., passed through a kneading part and extruded from a nozzle having a diameter of 2.0 mm. The fiber was then heated at 80° C., passed through a volatilizing part having a nitrogen gas flow of 10 l/min. and subsequently passed through the interior of six cylindrically arranged 400 W high-pressure mercury lamps so as to irradiate over approximately 5 minutes, followed by pulling up the fiber by nip rollers and winding on a bobbin at the rate of 20 cm/min.

The diameter of the fiber was 800 µm. The index distribution as measured by an Interfaco interference microscope includes the index of 1.460 at the central axis and the index of 1.451 at the periphery of the fiber. The refractive index decreased continuously from the central axis toward the periphery of the fiber.

The thickness of the peripheral layer having irregularity of the index distribution was found to be 10 µm.

NMR analysis was used to determine the distribution of the concentration of the copolymer of vinylidene fluoride and tetrafluoroethylene. The content of said copolymer was varied in the range of from 33% by weight (at the central axis of the fiber) to 43% by weight (at the periphery of the fiber). The content of the residual methyl methacrylate monomer was 0.9% by weight in the whole of the fiber.

The thus obtained graded-index optical transmission fiber was dipped in a solution of 10% of a black oil-soluble dyestuff (Orient Oil Black HBB) in methylene chloride at 0° C. for 30 minutes, and dried in nitrogen gas at 60° C. for 10 minutes. The thus treated medium was observed using a microscope and was found to have a black dyed layer formed under the surface of the medium and having a thickness of 15 μm.

As a result of the measurement of modulation transfer function (MTF) using slits of 6.4 rows per 1 mm, the black-dyed medium had a MTF value 20% higher than a corresponding medium which had not been dyed and was ascertained that it had an advanced resolving power and was capable of giving an advanced contrast to an image.

Figure 8:
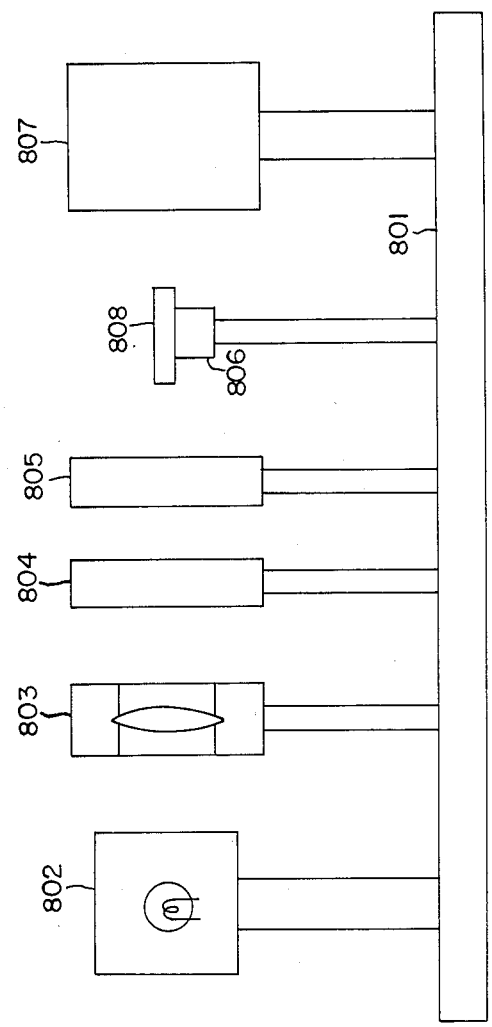
FIG. 8 shows an apparatus for observing a lattice image formed using the plastic optical transmission medium of the present invention.

Further, the lattice images formed by using the black-colored optical transmission medium and a non-colored optical transmission medium were compared by means of an apparatus as shown in FIG. 8.

In FIG. 8, 801 is an optical bench, 802 is a tungsten lamp used as light source, 803 is a light converging lens, 804 is a stop, 805 is a glass plate on which a square lattice of 0.1 mm interval is formed by the fine processing of the chrome layer of the chrome plated glass, 806 is a sample holder, 807 is a Polaroid camera, and 808 is a sample subject to the evaluation.

Each sample as prepared was cut into length of one fourth of the period of the ray as measured based on undulation of He-Ne laser rays passing therethrough and polished at the end faces by a grinder so as to obtain flat faces parallel to each other and perpendicular to the major axis.

As seen from FIG. 8, the sample 808 as prepared was set on the sample holder 806. After the stop 804 was adjusted so as to let the light from the source 802 pass through lens 803, stop 804 and the glass plate 805 and enter the whole face of the sample, the positions of the sample 808 and Polaroid camera 807 were adjusted so as to focus the light on the Polaroid camera. As a result, the square lattice image was obtained and the distortion thereof was observed.

Figure 9B:
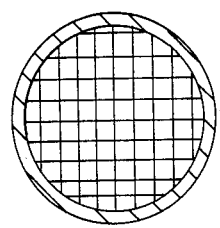
FIGS. 9(A) and (B) respectively show lattice images formed using a plastic optical transmission medium having no layer containing a light-absorbing substance and the plastic optical transmission medium of the invention having said layer of light absorbing material.
Figure 9A:
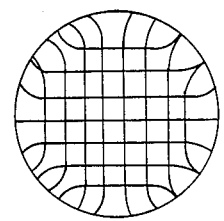

The thus observed lattice images are shown in FIG. 9. FIG. 9(A) shows a lattice image formed using a non-color treated lens. FIG. 9(B) shows a lattice image formed using a black-colored lens according to the invention. As seen from the figures, distortion of a lattice image existed at the periphery thereof when the non-colored lens was used. On the other hand, such distortion was eliminated by the black-colored lens.

EXAMPLE 2

A plastic optical transmission medium was prepared in the same manner as in Example 1, with the exception that acetone was used instead of methylene chloride.

The cross section of thus prepared medium was observed, with the result that the layer containing black oil-soluble dyestuff was found to be formed all around the periphery of the medium in the thickness of approximately 10 μm.

Further, the MTF value of the medium was measured and found to be the same as that of the medium prepared in Example 1.

EXAMPLE 3

A plastic optical transmission medium was prepared in the same manner as in Example 1, with the exception that the temperature of the solution containing the black oil-soluble dyestuff was maintained at 20° C.

The layer containing said black dyestuff was found to have a thickness of approximately 50 μm.

EXAMPLE 4

A plastic optical transmission medium was prepared in the same manner as in Example 1, with the exception that the production of the fiber and the dipping thereof were successively carried out without winding the fiber on the bobbin.

EXAMPLE 5

The mixture of 33 parts by weight of the copolymer comprising 60% by mole of vinylidene fluoride and 20% by mole of tetrafluoroethylene (refractive index $\eta_D = 1.400$), 33 parts by weight of polymethyl methacrylate prepared by continuous bulk polymerization (refractive index $\eta_D = 1.492$), 33 parts by weight of methyl methacrylate, 0.1 part by weight of benzylmethyl ketal and 0.1 part by weight of hydroquinone was heated at 80° C., passed through a kneading part and extruded from a nozzle having a diameter of 2.0 mm. The thus prepared fiber was then heated at 80° C., passed through a volatilizing part having a nitrogen gas flow of 10 1/min. and subsequently passed through the interior of six cylindrically arranged 400 W high-pressure mercury lamps so as to irradiate light over approximately 5 minutes, followed by pulling up the fiber by nip rollers and winding on a bobbin at the rate of 20 cm/min.

The diameter of thus obtained fiber was 800 μm. The index distribution as measured by Interfaco interference microscope includes the index of 1.460 at the central axis and the index of 1.451 at the periphery of the fiber. The refractive index decreased continuously from the central axis toward the periphery of the fiber.

The thickness of the peripheral layer having irregularity in the index distribution was found to be 50 μm.

NMR analysis was used to determine the distribution of the concentration of the copolymer of vinylidene fluoride and tetrafluoroethylene. The content of said copolymer was varied in the range of from 33% by weight (at the central axis of the fiber) to 43% by weight (at the periphery of the fiber). The content of the residual methyl methacrylate monomer was 0.9% by weight in the whole of the fiber.

This thus obtained graded-index optical transmission medium was dipped in a solution of 10% of a black oil-soluble dyestuff (Orient Oil Black HBB) in methylene chloride at 0° C. for 30 minutes, and dried in nitrogen gas at 60° C. for 10 minutes. The thus treated medium was observed using a microscope and was found having a blackly dyed layer formed under the surface of the medium and having a thickness of 75 μm.

As a result of the measurement of modulation transfer function (MTF) using slits of 6.4 rows per 1 mm, the blackly dyed medium had a MTF value higher by 20% than a medium having not been dyed and was ascertained that it had an advanced resolving power and was capable of giving an advanced contrast to an image.

EXAMPLE 6

The mixture of 33 parts by weight of the copolymer comprising 80% by mole of vinylidene fluoride and 20% by mole of tetrafluoroethylene (refractive index $N_D=1.400$), 33 parts by weight of polymethyl methacrylate prepared by continuous bulk polymerization (refractive index $ND=1.492$, 33 parts by weight of methyl methacrylate, 0.1 part of weight of benzylmethyl ketal and 0.1 part by weight of hydroquinone was heated at 80° C., passed through a kneading part and extruded from a nozzle having a diameter of 2.0 mm. The thus prepared fiber was then heated at 80° C., passed through a volatilizing part in which nitrogen gas was flown at the rate of 10 l/min. and subsequently passed through the interior of cylindrically arranged six pieces of 400 W high-pressure mercury lamps so as to irradiate light over approximately 5 minutes, followed by pulling up the fiber by nip rollers and winding on a bobbin at the rate of 20 cm/min.

The diameter of thus obtained fiber was 800 μm. The index distribution as measured by Interfaco interference microscope includes the index of 1.460 at the central axis and the index of 1.451 at the periphery of the fiber. The refractive index was continuously lowered from the central axis toward the periphery of the fiber.

The thickness of the peripheral layer having irregularity in the index distribution was found to be 75 μm.

The NMR analysis taught the distribution of the concentration of the copolymer of vinylidene fluoride and tetrafluoroethylene. The content of said copolymer was varied in the range of from 33% by weight (at the central axis of the fiber) to 43% by weight (at the periphery of the fiber). The content of the residual methyl methacrylate monomer was 0.9% by weight in the whole of the fiber.

The thus obtained graded-index optical transmission medium was dipped in a solution of 10% of a black oil-soluble dyestuff (Orient Oil Black HBB) in methylene chloride at 0° C. for 30 minutes, and dried in nitrogen gas at 60° C. for 10 minutes. The thus treated medium was observed using a microscope and was found having a blackly dyed layer formed under the surface of the medium and having a thickness of 100 μm.

As a result of the measurement of modulation transfer function (MTF) using slits of 6.4 rows per 1 mm, the blackly dyed medium had a MTF value higher by 15% than a medium having not been dyed.

EXAMPLE 7

A plastic optical transmission medium was prepared in the same manner as in Example 1, with the exception that the black-colored oil-soluble dyestuff was Orient-Balifast-Color 3820. The thickness of the layer containing the blackcolored dyestuff was determined to be 50 μm, and MTF value was the same as that of Example 5.

EXAMPLE 8

An array of lenses was prepared in the form as shown in FIG. 5 by using the mediums prepared in Example 5. Fiber-reinforced epoxy resin board and epoxy adhesive containing carbon black were used as substrates and an adhesive, respectively.

As a result of the measurement of MTF using slits of 6.4 rows per 1 mm, the array had a MTF value higher by 20% than an array using non-colored medium. The resolving power and the contrast of an image formed were found to be enhanced.

EXAMPLE 9

An array of lenses was prepared by using the medium prepared in Example 1 and applying an adhesive at regular intervals from the end faces of the mediums. The MTF value was found to be the same as that of the medium prepared in Example 1.

EXAMPLE 10

An array of lenses was prepared in the form as shown in FIG. 6 using the medium prepared in Example 5. Polymethyl methacrylate resin boards and an acrylic adhesive containing carbon black were used as substrates and an adhesive, respectively.

Further, an array was prepared in the same manner as above, with the exception that fiber-reinforced epoxy resin boards were used as substrates.

Those arrays were the same in view of the properties or easiness of handling. The former array was, however, industrially advantageous in view of its light weight, cheap cost.

EXAMPLE 11

A plastic optical transmission medium was prepared in the same manner as in Example 1, with the exception that a solution of 1% of a black oil-soluble dyestuff (Orient-Nigrocin-Base EX) in chloroform was used and that the dipping was carried out at 5° C. for 15 seconds. The thus prepared medium was found to have a blackly-dyed layer having a thickness of 8 μm which can not cover up unevenness of the index distribution at the periphery of the medium. MTF value was higher by 10% than a non-colored medium.

EXAMPLE 12

An optical transmission medium was prepared in the same manner as in Example 1, with the exception that the dipping time was 7 seconds. The thickness of the blackly-dyed layer was 5 μm and MTF value was higher by 5% than a non-colored medium.

EXAMPLE 13

An optical transmission medium was prepared in the same manner as in Example 1, with the exception that the dipping time was 5 seconds. The thickness of the blackly-dyed layer was 4 μm and MTF value was higher by 3% than a non-colored medium.

TABLE 1

|  | Thickness of Part Having Irregularity in Index Distribution | Thickness of Layer Containing Light Absorbing Substance | MTF Value | Relative Quantity of Light |
|---|---|---|---|---|
| Example 1 | 10 μm | 15 μm | 20% up | 0.97 |
| Example 2 | 10 μm | 10 μm | 20% up | 1.00 |
| Example 3 | 10 μm | 50 μm | 20% up | 0.80 |
| Example 4 | 10 μm | 15 μm | 20% up | 0.97 |
| Example 5 | 50 μm | 75 μm | 20% up | 1.18 |
| Example 6 | 75 μm | 100 μm | 15% up | 1.05 |
| Example 7 | 50 μm | 50 μm | 20% up | 1.33 |
| Example 8 | 50 μm | 50 μm | 15% up | — |
| Example 9 | 10 μm | 15 μm | 20% up | — |
| Example 10 | 50 μm | 75 μm | same as example 5 | — |
| Example 11 | 50 μm | 8 μm | 10% up | 1.01 |
| Example 12 | 50 μm | 5 μm | 5% up | 1.03 |
| Example 13 | 50 μm | 4 μm | 3% up | 1.03 |

I claim:

1. A plastic optical transmission medium having a singular body in which the refractive index varies continuously, in a radial direction from the interior toward the surface of the body, said body having a layer formed under the surface thereof and containing a light-absorbing substance.

2. The medium as claimed in claim 1, wherein said body is formed from a mixture of a first organic polymer having a first refractive index and a second organic polymer having a second refractive index different from said first refractive index, the relative proportions of said first and second polymer varying in a continuous manner from the interior of the body to the surface of the body such that the refractive index of the body varies.

3. The medium as claimed in claim 2, wherein said first organic polymer is polymethyl methacrylate and said second organic polymer is a copolymer of vinylidene fluoride and tetrafluoroethylene.

4. The medium as claimed in claim 2, wherein said first organic polymer is polymethyl methacrylate and said second organic polymer is a terpolymer of vinylidene fluoride, tetrafluoroethylene and hexafluoropropylene.

5. The medium as claimed in claim 1, wherein said light-absorbing substance is a black-colored oil soluble dyestuff.

6. The medium as claimed in claim 1, wherein the thickness of said layer containing a light-absorbing substance is 5 μm or more.

7. The medium as claimed in claim 6, wherein the thickness of said layer containing a light-absorbing substance is 8 μm or more.

8. The medium as claimed in claim 1, wherein said light-absorbing substance is dispersed in said layer.

9. A process for producing a plastic optical transmission medium comprising:
    (a) preparing a singular shaped plastic optical transmission element in which the refractive index varies continuously in a radial direction from the interior toward the surface of the element;
    (b) bringing the shaped element into contact with a liquid comprising a solvent and a light-absorbing substance wherein the solvent is selected such that it is capable of dissolving at least one component of the plastic, said contact being of sufficient duration to allow the light-absorbing substance to be taken up by a peripheral portion of the element to form a colored layer; and
    (c) drying the shaped element containing the colored layer to remove the solvent and form a plastic optical transmission medium having a light-absorbing substance under the surface of the shaped element.

10. The process as claimed in claim 9, wherein said shaped element is formed from a mixture comprising a first organic polymer having a first refractive index and a second organic polymer having a second refractive index different from said first refractive index.

11. The process as claimed in claim 10, wherein is said first organic polymer is polymethyl methacrylate and said second organic polymer is a copolymer of vinylidene fluoride and tetrafluoroethylene.

12. The process as claimed in claim 10, wherein said first organic polymer is polymethyl methacrylate, and said second organic polymer is a terpolymer of vinylidene fluoride, tetrafluoroethylene and hexafluoropropylene.

13. The process as claimed in claim 9, wherein a black-colored oil-soluble dyestuff is used as said light-absorbing substance.

14. The process as claimed in claim 13, wherein said layer containing light-absorbing substance is formed in the thickness of 8 μm or more.

15. The process as claimed in claim 9, wherein said layer containing a light-absorbing substance is formed in the thickness of 5 μm or more.

16. The process as claimed in claim 9, wherein said light-absorbing substance is dispersed in said layer.

17. An array of lenses comprising a plurality of plastic optical transmission elements each comprising a singular body in which the refractive index varies continuously in a radial direction from the interior toward the surface of the body, said body having a layer formed under the surface thereof and containing a light-absorbing substance.

18. The array of lenses as claimed in claim 17, wherein each said body comprises a mixture of a first organic polymer having a first refractive index and a second organic polymer having a second refractive index.

19. The array of lenses as claimed in claim 18 wherein said first organic polymer is polymethyl methacrylate and said second organic polymer is a copolymer of vinylidene fluoride and tetrafluoroethylene.

20. The array of lenses as claimed in claim 18 wherein said first organic polymer is polymethyl methacrylate and said second organic polymer is a terpolymer of vinylidene fluoride, tetrafluoroethylene and hexafluoropropylene.

21. The array of lenses as claimed in claim 17, wherein said light-absorbing substance is a black-colored oil-soluble dyestuff.

22. The array of lenses as claimed in claim 17, wherein the thickness of said layer containing light-absorbing substance is 5 μm or more.

23. The array of lenses as claimed in claim 22, wherein the thickness of said layer containing light-absorbing substance is 8 μm or more.

24. The array of lenses as claimed in claim 17, wherein said light-absorbing substance is dispersed in said layer.

* * * * *

UNITED STATES PATENT AND TRADEMARK OFFICE
CERTIFICATE OF CORRECTION

PATENT NO. : 4,799,761
DATED : January 24, 1989
INVENTOR(S) : Takashi Yamamoto et al.

It is certified that error appears in the above-identified patent and that said Letters Patent is hereby corrected as shown below:

Column 5, line 1, "0.39" should read --0.37--;
Column 6, line 56, "39" should read --31--;
Column 6, line 58, "40" should read --32--;
Column 9, line 17, "31" should read --33--;
Column 14, between lines 44 and 45, insert --The results obtained in the above examples are all shown in the following Table 1:--;
Column 16, line 3, delete "is".

Signed and Sealed this

Fifteenth Day of May, 1990

Attest:

HARRY F. MANBECK, JR.

Attesting Officer

Commissioner of Patents and Trademarks